United States Patent
Yamashita et al.

(10) Patent No.: US 8,497,641 B2
(45) Date of Patent: Jul. 30, 2013

(54) HDD WITH VCM BACK EMF AND VOLTAGE CONTROL CIRCUITRY

(75) Inventors: Masaki Yamashita, Niiza (JP); Chisako Ota, Nerima-ku (JP); Nobuhiko Wasa, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 495 days.

(21) Appl. No.: 12/720,950

(22) Filed: Mar. 10, 2010

(65) Prior Publication Data

US 2010/0302670 A1    Dec. 2, 2010

(30) Foreign Application Priority Data

May 31, 2009    (JP) .................. 2009-131664

(51) Int. Cl.
*H02P 5/00* (2006.01)
*H02P 5/46* (2006.01)
*H02P 7/08* (2006.01)

(52) U.S. Cl.
USPC ..................... 318/66; 318/400.29; 360/75

(58) Field of Classification Search
USPC ............... 318/66, 400, 29, 400.29; 360/75
See application file for complete search history.

(56) References Cited

U.S. PATENT DOCUMENTS

| 5,455,496 A * | 10/1995 | Williams et al. ............. 318/563 |
| 6,721,119 B1 * | 4/2004 | Hassan et al. .................. 360/75 |
| 7,863,841 B2 * | 1/2011 | Menegoli et al. ........ 318/400.29 |
| 2004/0066981 A1 * | 4/2004 | Li et al. ......................... 382/286 |
| 2004/0080858 A1 * | 4/2004 | Suzuki ............................ 360/75 |
| 2010/0182715 A1 * | 7/2010 | Harmer .......................... 360/75 |

* cited by examiner

*Primary Examiner* — Erick Glass
(74) *Attorney, Agent, or Firm* — Lawrence J. Bassuk; W. James Brady; Frederick J. Telecky, Jr.

(57) ABSTRACT

To provide a disk drive capable of inhibiting the occurrence of acoustic noise caused by a voltage pulse when the head is retracted using a speed control method using voltage obtained by rectifying a back electromotive force after the power source has been cut off from the rotation of a spindle motor. Retraction control circuit is used to control the on and off modes of transistors in accordance with the speed of VCM. The voltage across VCM becomes a voltage that can be regulated with VCM voltage control circuit. At this time, voltage is supplied to the terminals based on the voltage of ISO5V that is the rectified voltage of the back electromotive force of the spindle motor and the pulsating voltage is synchronized and produced at both terminals. As a result, the potential difference across VCM is such that the pulsating voltage is negated and acoustic noise is inhibited.

4 Claims, 8 Drawing Sheets

HDD WITH VCM BACK EMF AND VOLTAGE CONTROL CIRCUITRY

FIELD OF THE INVENTION

The present invention relates to a disk drive provided with an emergency head retraction function.

BACKGROUND OF THE INVENTION

For example, when a magnetic disk device used for reproducing and recording on hard disks and other disk recording media is used, the head placed on the front of the arm is moved to a desired position on the disk by using an arm actuator and data are recorded and reproduced.

When data are not recorded or reproduced, the head is retracted (Retract: retract) to a safe area known as a ramp so that the head does not impact the recording surface of the disk due to vibration or impact from the outside. Thus, by using the ramp to retract the head, impact of the head with the disk can be prevented. When data are recorded and reproduced, the head in the ramp is loaded to a desired position on the recording surface of the disk.

A first inclined ascending part, a horizontal, part and a second inclined descending part are disposed from a side close to the disk on the ramp. The tip of the second inclined part becomes a packing area where the head is retained.

The arm is moved by driving an actuator using, for example, a voice coil motor (VCM) or other drive means.

The abovementioned retraction must be carried out even if the power source is cut off so the voltage obtained by rectifying a back electromotive force of the spindle motor that continues to turn even after the power is cut off is used as a power source for the retraction operation.

A method is available that involves applying a constant voltage to a VCM for a prescribed amount of time during a retraction operation. This method involves a constant torque on the VCM so that acoustic noise does not result. However, since precise speed control is difficult, the actuator comes in contact with the crash stop of the end point of the ramp and is stopped at the very end of the retraction operation. As a result, the maximum value of the number of unloading operations is lowered in consideration of the reliability aspect of the impact resistance of the head.

Meanwhile, a speed control method is available that involves retracting the VCM which moves the actuator to the ramp under constant speed control while measuring the speed. When this method is used, the head moving speed can be controlled using the retraction operation and the abovementioned impact can be mitigated by reducing the speed of the head when the retraction operation has been completed.
[Patent Document 1] U.S. Pat. No. 7,301,722

Meanwhile, a voltage pulse is created in the voltage obtained by rectifying the counter electromotive force using the rotation of the spindle motor in the retraction operation when the power is cut off. When the voltage is used as is, problems exist in that VCM drive torque fluctuations occur due to the voltage pulse and this causes acoustic noise.

Taking note of this situation, an objective of the present invention is to provide a disk drive that can inhibit the occurrence of acoustic noise using a voltage pulse when retracting the head using the speed control method using the voltage obtained by rectifying the back electromotive force from the rotation of the spindle motor after the power has been cut off.

SUMMARY OF THE INVENTION

In order to obtain the abovementioned objective, the disk drive of the present invention is a disk drive used to generate a drive voltage of a second motor used to move the abovementioned head based on rectified voltage rectified from the back electromotive force generated in a first motor used to turn the abovementioned disk-shaped recording medium when the head used to read or record information on a disk-shaped recording medium is retracted, the invention being characterized by being provided with a detection means used to detect the speed of the abovementioned head, a motor drive means wherein the abovementioned drive voltage having positive polarity or negative polarity is applied to the abovementioned second motor in accordance with input control signals and at the same time the abovementioned drive voltage is adjusted so that it is constant without depending on a pulsating component of the abovementioned rectified voltage and a control means used to output the abovementioned control signals used to control the abovementioned drive voltage in accordance with the detection results of the abovementioned detection means.

The abovementioned control means of the disk drive of the present invention is best suited for adjusting the abovementioned polarity and the output timing of the abovementioned drive voltage in accordance with the detection results of the abovementioned detection means so that the abovementioned head moves at a prescribed speed.

The abovementioned motor drive means of the disk drive of the present invention is best suited to adjusting so that the abovementioned drive voltage approaches a reference voltage set according to the abovementioned control signals; the abovementioned control means also outputs the abovementioned control signals used to set the abovementioned reference voltage according to the detection results of the abovementioned detection means so that the abovementioned head moves at a prescribed speed.

The disk drive of the present invention is ideally provided with a first voltage supply line and a second voltage supply line used to provide the above-mentioned rectifying voltage; the abovementioned motor drive means comprises a first drive voltage supply means such that, when the abovementioned drive voltage having positive polarity is applied to the abovementioned second motor and when a first input node of the abovementioned second motor is connected to the abovementioned first voltage supply line and the abovementioned drive voltage having negative polarity is applied to the abovementioned second motor, a second input node of the abovementioned second motor is connected to the abovementioned first voltage supply line;

and a second drive voltage supply means such that when the above-mentioned drive voltage having positive polarity is applied to the abovementioned second motor the voltage occurring between the abovementioned second input node and the abovementioned second voltage supply line is adjusted so that said drive voltage approaches the abovementioned reference voltage, and when the abovementioned drive voltage having negative polarity is applied to the abovementioned second motor, the voltage occurring between the abovementioned first input node and the above-mentioned second voltage supply line is adjusted so that said drive voltage approaches the abovementioned reference voltage.

The abovementioned detection means of the disk drive of the present invention ideally detects the back electromotive force produced by the abovementioned second motor while the abovementioned motor drive means is not applying the abovementioned drive voltage to the abovementioned second motor.

When the abovementioned head is retracted, the drive device of the present invention ideally has a rectifying circuit that is used to output the above-mentioned rectified voltage obtained by used to rectifying the back electromotive force generated by polyphase coil comprising the abovementioned first motor between the abovementioned first voltage supply line and the abovementioned second voltage supply line.

The abovementioned first drive voltage supply means of the disk drive of the present invention ideally has a first transistor placed between the abovementioned first voltage supply line and the abovementioned first input node and a second transistor placed between the abovementioned first voltage supply line and the above-mentioned second input node; the abovementioned second drive voltage supply means is provided with a third transistor placed between the first input node and the above-mentioned second voltage supply line, a fourth transistor placed between the above-mentioned second input node and the abovementioned second voltage supply line and a transistor control means used to control a transistor selected in accordance with the abovementioned polarity from between the abovementioned third transistor and the abovementioned fourth transistor so that the potential difference between the abovementioned first input node and the abovementioned second input node approaches the abovementioned reference voltage.

The disk drive of the present invention in an unloading operation ideally places the abovementioned first and fourth transistors in the off mode and places the abovementioned second transistor in the on mode, and the abovementioned transistor control means selects and controls the abovementioned third transistor; and in a loading operation the abovementioned first transistor is placed in the on mode, the abovementioned second and third transistors are placed in the Off mode and the abovementioned transistor control means selects and controls the above-mentioned fourth transistor.

REFERENCE NUMERALS AND SYMBOLS AS SHOWN IN THE DRAWINGS

In the figures, 1 represents an HDD control device, 10 represents a drive group, 12 represents an SPM driver, 14 represents a VCM driver, 16 represents a charge pump, 18 represents a retractive control group, 30 represents a spindle motor, 32 represents a SPM-FET circuit, 34 represents a retractive damping resistance part, 38 represents a VCM-FET circuit, 39 represents a VCM, 44 represents a RETSPM driver, 48 represents a RET power source circuit, 50 represents a RET control unit, 52 represents a RETVCM driver, 61 represents a A/D converter, 63 represents a retractive control circuit, 80 represents a VCM voltage control circuit, 90 represents a general control circuit.

DESCRIPTION OF THE EMBODIMENTS

The present invention provides a disk drive that can inhibit the occurrence of acoustic noise using a voltage pulse flow when the head is retracted using a speed control method using voltage obtained by rectifying the back electromotive power when the spindle motor is turned after the power is cut off.

Figure 1:
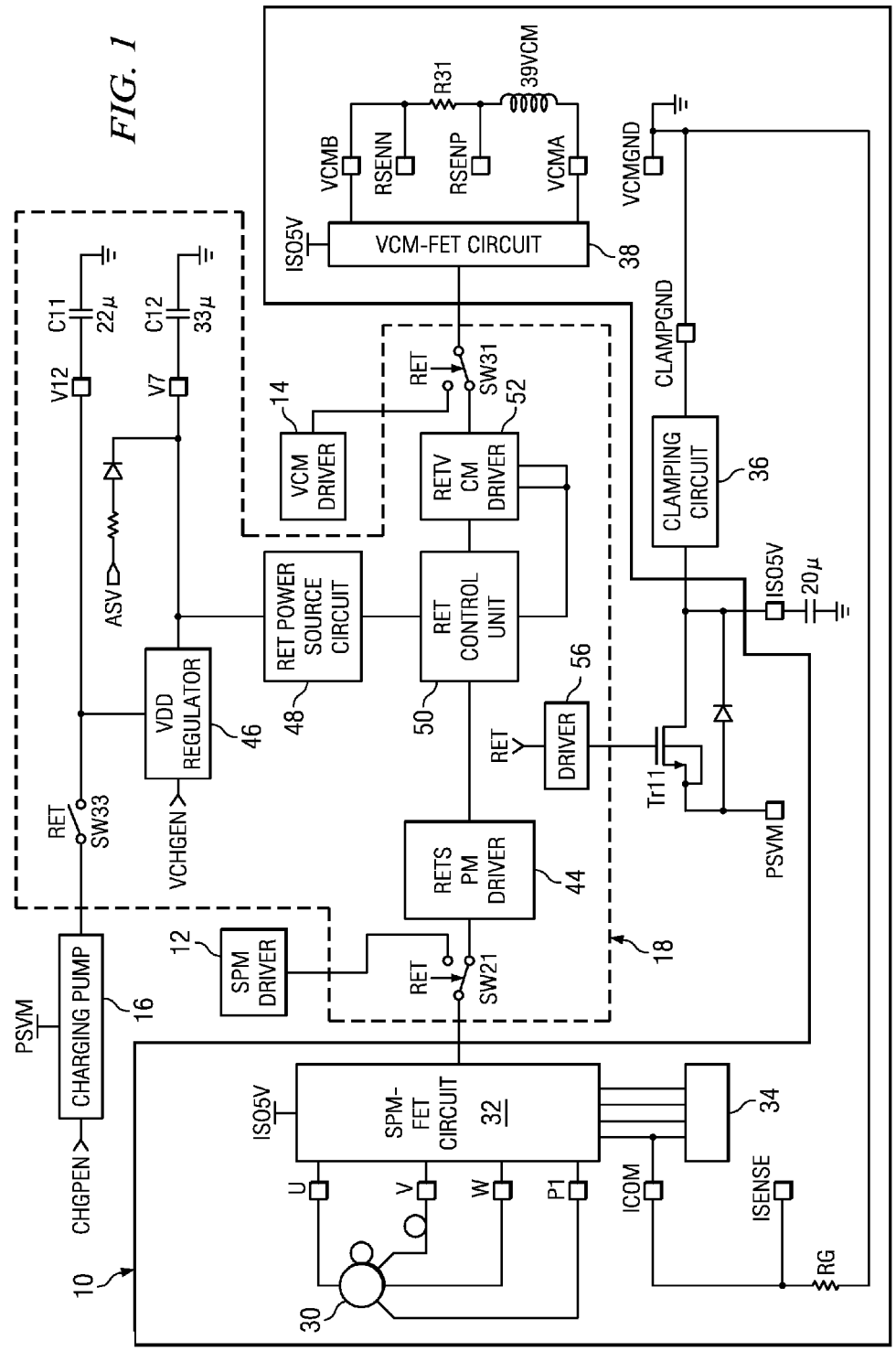
FIG. 1 is an overall configuration diagram of an HDD control device in an embodiment of the present invention.
Figure 2:
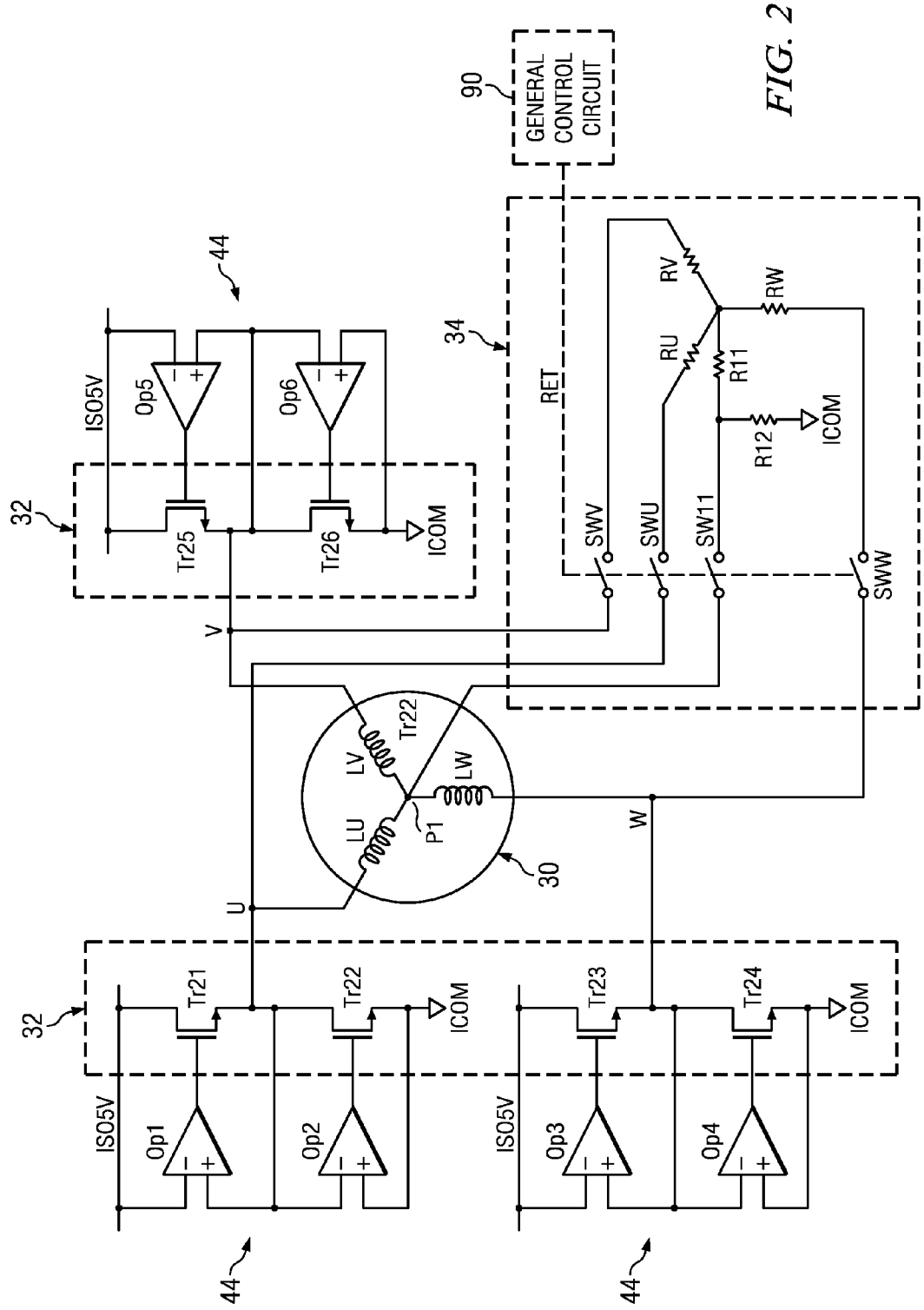
FIG. 2 is a configuration diagram of the spindle motor, SPM-FET circuit and RETSPM driver indicated in FIG.

FIG. 1 is a schematic overall configuration diagram of HDD control device 1 in an embodiment the present invention. FIG. 2 is a schematic configuration diagram of spindle motor 30, SPM-FET circuit 32 and RETSPM driver 44 indicated in FIG. 1.

As indicated in FIG. 1, HDD control device 1 is provided with a drive group 10 consisting of an SPM (spindle motor) and a VCM (voice coil motor), an SPM driver 12 used during normal operation, a VCM driver 14 used during normal operation, a charging pump circuit 16 and a retraction control group 18 used during retraction operation.

Here, spindle motor 30 is an example of the first motor of the present invention and VCM 39 is an example of the second motor of the present invention.

Figure 4:
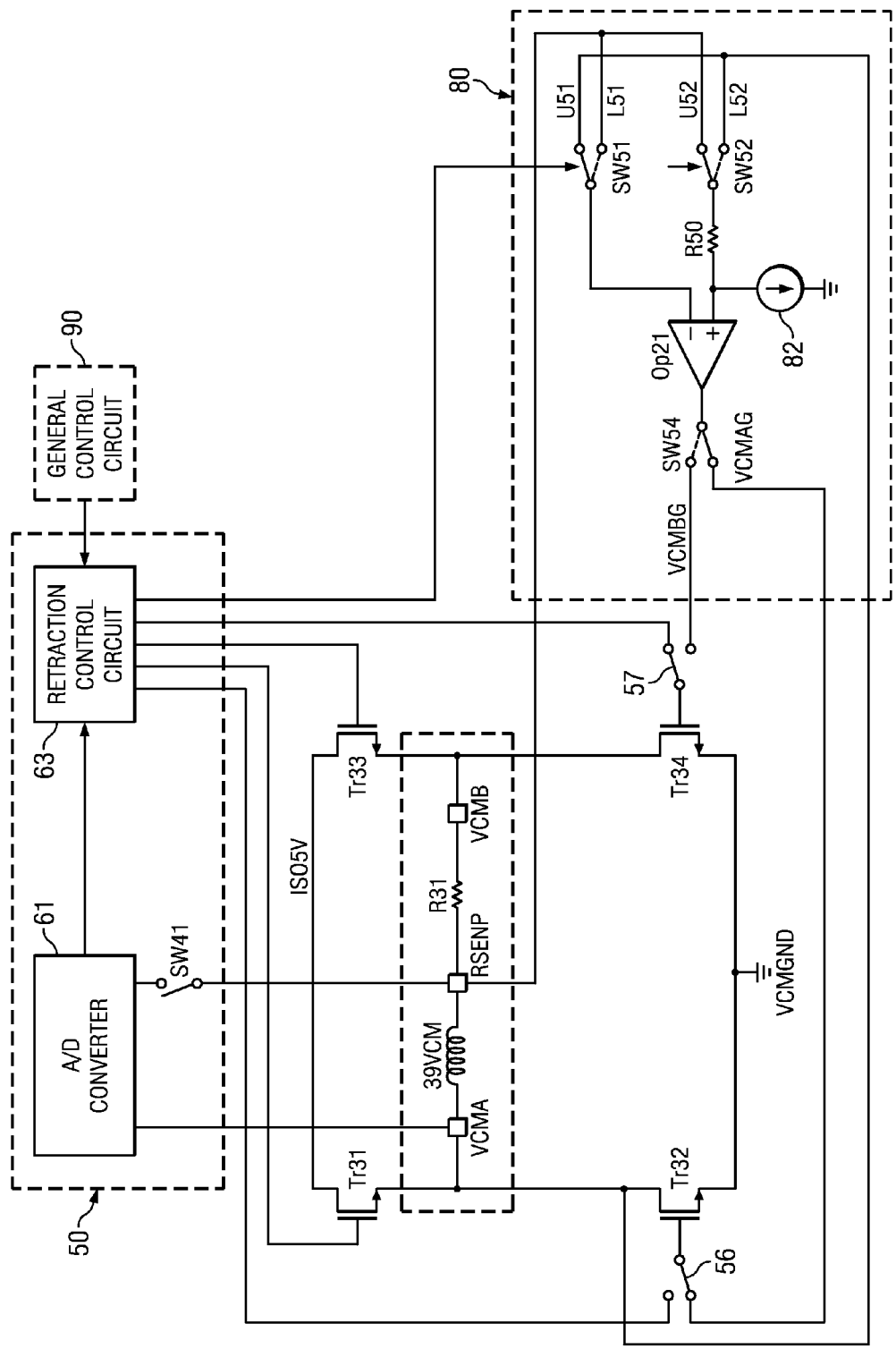
FIG. 4 is a configuration diagram of the RETVCM driver indicated in FIG. 1.

Moreover, part of the function of switch SW41, A/D converter 61 and retraction control circuit 63 indicated in FIG. 4 is an example of the detection means of the present invention.

Furthermore, an example of the motor drive means and the control means of the present invention is realized by RETVCM driver 52.

First, drive group 10 will be described.

As indicated in FIG. 1, drive group 10 is provided with a spindle motor 30, an SPM-FET circuit 32, a retraction damping resistance part 34, a clamping circuit 36, a voice coil motor 39, a VCM-FET circuit 38 and the like.

Spindle Motor 30

Spindle motor 30 is a three-phase drive type DC motor. As indicated in FIG. 2, one end of coils LU, LV and LW is connected to contact point P1.

The other end of the LU coil is connected to terminal U, the other end of coil LV is connected to terminal V and the other end of coil LW is connected to terminal W.

Spindle motor 30 is connected to SPM driver 12 or RETSPM driver 44 via SPM-FET circuit 32 and switch SW21. During normal operation, SPM driver 12 and SPM-FET circuit 32 are connected by switch SW21 and spindle motor 30 is driven by SPM driver 12. On the other hand, RETSPM driver 44 and SPM-FET circuit 32 are connected by switch SW21. The connecting and switching operation for this switch SW21 are carried out in response to a retraction signal RET indicating a retraction operation.

SPM-FET Circuit 32

The drain of transistor Tr21 is connected to an ISO5V power source line in SPM-FET circuit 32, as indicated in FIG. 2. In FIG. 2, a switch SW21 (not shown in the figure) is indicated as interposed between SPM-FET circuit 32 and RETSPM driver 44. Switch SM21 is located respectively between each of operational amplifiers Op1 through Op6 and between the gates of each of the transistors Tr21 through Tr26 and is used to carry out switching of a signal line connected to the gate of each of transistors Tr21 through Tr26.

When switch SW21 indicated in FIG. 1 is connected to the RETSPM driver 44 side, the gate of transistor Tr21 is connected to the output terminal of operational amplifier Op1 of RETSPM driver 44, as indicated in FIG. 2: The negative terminal of operational amplifier Op1 is connected to the ISO5V power source line. The source of transistor Tr21 is connected to the positive terminal and the U terminal of operational amplifier Op1.

The source of transistor Tr21 is connected to the drain of transistor Tr22 and the negative terminal of operational amplifier Op2. The gate of transistor Tr22 is connected to the output terminal of operational amplifier Op1 via switch SW21 during a retraction operation. The source of transistor Tr22 is connected to the positive terminal and the ICOM terminal of operational amplifier OP2. The ICOM terminal is connected to ground via resistance RG as indicated in FIG. 1.

Operational amplifiers Op1 and Op2 are contained in RETSPM driver 44 indicated in FIG. 1.

Moreover, the drain of transistor Tr23 is connected to the ISO5V power source line, as indicated in FIG. 2.

When switch SW21 indicated in FIG. 1 is connected to the RETSPM driver 44 side, the gate of transistor Tr23 is connected to the output terminal of operational amplifier Op3 of RETSPM driver 44, as indicated in FIG. 2. The negative terminal of operational amplifier Op3 is connected to the ISO5V power source line. The source of transistor Tr23 is connected to the positive terminal and the W terminal of operational amplifier Op3.

The source of transistor Tr23 is connected to the drain of transistor Tr24 and the negative terminal of operational amplifier Op4. The gate of transistor Tr24 is connected to the output terminal of operational amplifier Op4 via switch SW21 during a retraction operation. The source of transistor Tr24 is connected to the plus terminal and Icom terminal of operational Op4.

Operational amplifiers Op3 and Op4 are contained in RETSPM driver 44 indicated in FIG. 1.

Moreover, the drain of transistor Tr25 is connected to the ISO5V power source line, as indicated in FIG. 2.

When switch SW21 indicated in FIG. 1 is connected to the RETSPM driver 44 side, the gate of transistor Tr25 is connected to the output terminal of operational amplifier Op5 of RETSPM driver 44 as indicated in FIG. 2. The negative terminal of operational amplifier Op5 is connected to the ISO5V power source line. The source of transistor Tr25 is connected to the positive terminal and the V terminal of operational amplifier Op5.

The source of transistor Tr25 is connected to the drain of transistor Tr26 and the negative terminal of operational amplifier Op6. The gate of transistor. Tr26 is connected to the output terminal of operational amplifier Op6 via switch SW21 during a retraction operation. The source of transistor Tr26 is connected to the positive terminal and the ICOM terminal of operational amplifier Op6.

Operational amplifiers Op5 and Op6 are contained in RETSPM driver 44 indicated in FIG. 1.

Each of transistors Tr21 through Tr26 and each of operational amplifiers Op1 through Op6 used to drive each of the gates of said transistors Tr21 through Tr26 respectively form a rectifying circuit.

Retraction Damping Resistance Part 34

Retraction damping resistance part 34 is provided with resistance RU, resistance RV and resistance RW wherein one of the terminals is connected to a common node as well as resistance R11 and resistance R12 that are connected serially between this common node and the ICOM terminal, as indicated in FIG. 2.

The other end of resistance RU is connected to the U terminal via switch SWU. The other end of resistance RV is connected to the V terminal via switch SWV. The other end of resistance RW is connected to the W terminal via switch SWW. Moreover, the node that connects resistance R11 and resistance R12 is connected to contact point P1 of spindle motor 30 via switch SW11.

Switches SWV, SWU, SW11 and SWW close in response to a retraction signal RET during a retraction operation. As a result, a path is formed during a retraction operation wherein a current flows corresponding to the voltage generated by the back electromotive force of coils LU, LV and LW of spindle motor 30. This current path is such that when the current supplied from each of coils LU, LV and LW to the ISO5V power source line stops, current from terminals U, V and W is stopped to reduce the spike noise occurring at terminals U, V and W by the back electromotive force of coils L11, LV and LW. For example, when the voltage of the U terminal drops and transistor Tr21 goes off from a state wherein transistor Tr21 is in the on mode and a current (voltage) is supplied to the ISO5V power source line from coil LU, a spike voltage caused by the back electromotive force of the LU coil is generated on the U terminal. However, the abovementioned spike voltage is inhibited if current flows in the path of the U terminal, switch SWU, resistance RU, resistance R11, switch SW11 and the P1 terminal. The voltage noise occurring on the other terminals V and W is also inhibited by retraction damping resistance part 34 as was the case with the U terminal.

Figure 3:
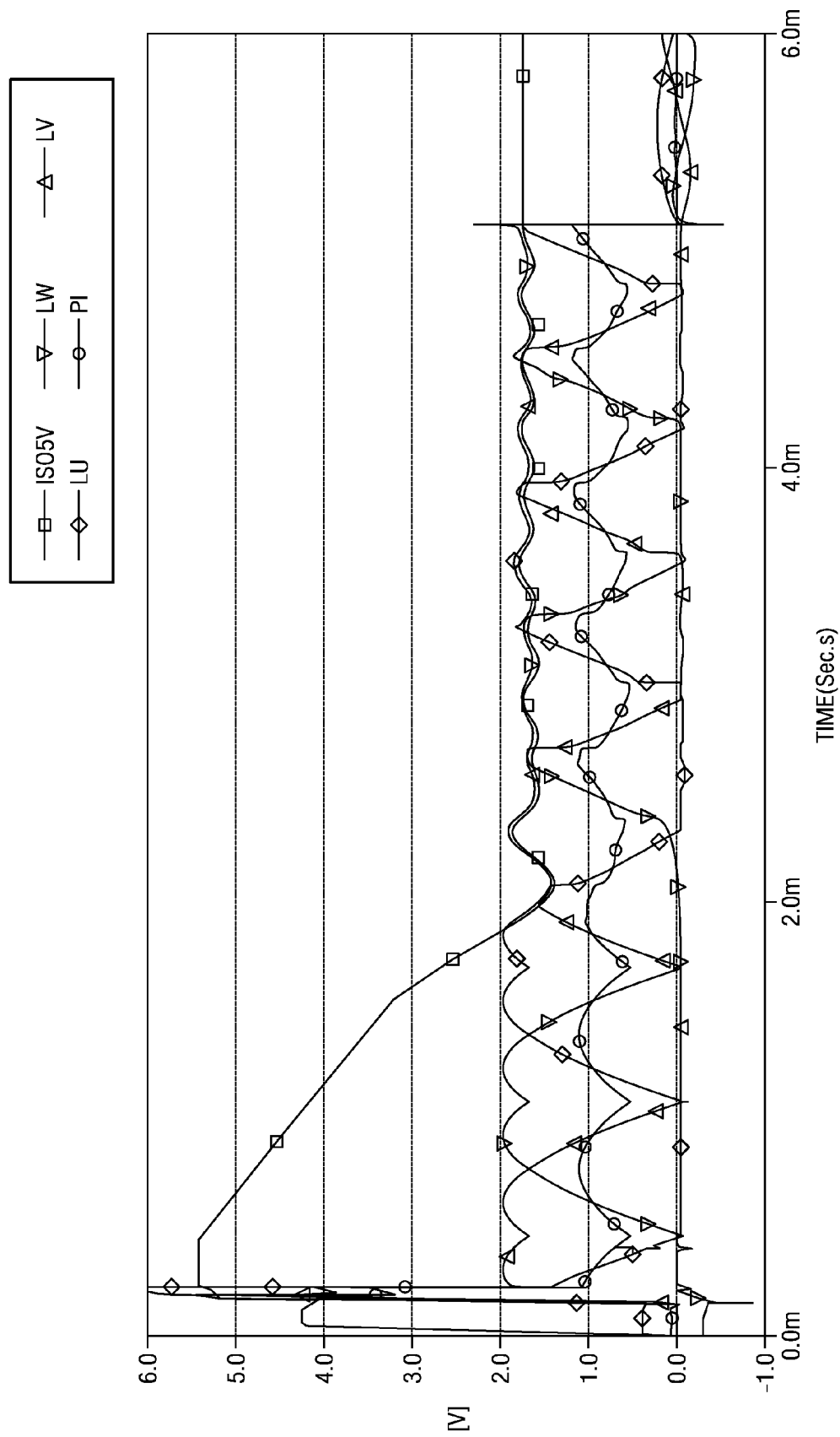
FIG. 3 is a diagram explaining the operation of the SPM-FET circuit indicated in FIG. 1.

In the circuit indicated in FIG. 2, the maximum voltage of the voltages produced by the back electromotive force of coils LU, LV and LW is output to the ISO5V power source line, as indicated in FIG. 3. This means that the voltage obtained by rectifying the back electromotive force (BEMF) occurring in spindle motor 30 during a retraction operation is produced in the ISO5V power source line. The voltage pulse flow indicated in FIG. 3 that is produced based on a correlation with the three-phase back electromotive force of the spindle motor is generated for said voltage. We shall discuss this operation later.

Clamping Circuit 36

The input side of a clamping circuit 36 is connected to the drain of transistor Tr11 and the ISO5V power source line.

Moreover, the source of transistor Tr11 is connected to a P5VM terminal to which voltage from an outside power source is applied.

The electric potential of the gate of transistor Tr11 is controlled by driver 56. Specifically, when it is indicated that retraction signal RET is involved in a retraction operation, driver 56 is used to separate the ISO5V power source line from the outside power source by turning transistor Tr11 on. Meanwhile, when it is indicated that retraction signal RET is involved in a normal operation, transistor Tr11 is turned on by driver 56 and the external power source is connected to the ISO5V power source line.

Clamping circuit 36 clamps so that the voltage of the ISO5V power source line does not exceed a prescribed upper limit value.

VCM-FET Circuit 38

VCM-FET circuit 38 comprises transistors Tr31, Tr32, Tr33 and Tr34, as indicated in FIG. 4. Each of transistors Tr31 through Tr34 is controlled so that it is in the on or off mode as suitable and a drive voltage is applied to VCM39 via the VCMA terminal and the VCMB terminal. The voltage applied to VCM39 is determined according to the potential difference between the VCMA terminal and the VCMB terminal.

The drains of transistors Tr31 and Tr33 are connected to the ISO5V power source line.

The source of transistor Tr31 is connected to the VCMA terminal and to the drain of transistor Tr32.

The source of transistor Tr33 is connected to the VCMB terminal and to the drain of transistor Tr34.

The sources of transistors Tr32 and Tr34 are connected to the VCMGND terminal. The VCMGND terminal is connected, for example, to ground.

In this embodiment of the present invention, on and off modes of transistors Tr31, Tr32, Tr33 and Tr34 are controlled between the ISO5V power source line and the VCMA terminal, between the VCMA terminal and the VCMGND terminal, between the ISO5V power source line and the VCMB terminal and between the VCMB terminal and the VCMGND terminal so that the on resistance during connection and the voltage drop can be diminished, so that a low loss circuit can be configured.

VCM39 and resistance R31 are connected serially between the VCMA terminal and the VCMB terminal: VCM 39 is connected to VCM driver 14 or RETVCM driver 52 via VCM-FET circuit 38 and switch SW31, as indicated in FIG. 1. During normal operation, VCM driver 14 and VCM-FET circuit 38 are connected by switch SW31 and VCM39 is driven by VCM driver 14. Meanwhile, during a retraction operation, RETVCM driver 52 and VCM-FET circuit 38 are connected by switch SW31 and VCM39 is driven by RETVCM driver 52. The connecting and switching operation for switch SW31 is carried out in response to a retraction signal RET indicating a retraction operation.

SPM Driver 12

SPM driver 12 is selected by switch SW21 during normal operation and controls SPM-FET circuit 32 so that normal operation is carried out in spindle motor 30. This means that drive signals are supplied to spindle motor 30 and spindle motor 30 is driven.

VCM Driver 14

VCM driver 14 is selected using switch SW31 during normal operation and controls VCM-FET circuit 38 so that normal operation is carried out in VCM39. This means that drive signals are supplied to VCM39 and VCM39 is driven.

Charging Pump Circuit 16

During normal operation, charging pump circuit 16 is used to input voltage of the P5VM power source line connected to a 5 V external power source. Voltage raising operation are carried out and capacitor C11 is charged. As a result, an electric potential of approximately 12 V is produced at the V12 terminal. Switch SW33 is controlled by a retraction signal RET and is in the off mode during a retraction operation.

Next, retraction control group 18 will be described in detail.

Retraction control group 18 is provided with switch SW21, RETSPM driver 44, VDD regulator 46, RET power source circuit 48, RET control unit 50, RETVCM driver 52 and switch SW31.

RETSPM Driver 44

As indicated above, RETSPM driver 44 is provided with operational amplifiers Op1, Op2, Op3, Op4, Op5 and Op6, as indicated in FIG. 2.

For example, when electric power supplied from an external power source is cut off, a back electromotive force is produced by coils LU, LV and LW of spindle motor 30 when spindle motor 30 turns due to an inertial force.

When the electric potential generated in terminals U, W and V corresponding to the back electromotive force is higher than the electric potential of the ISO5V power source line, operational amplifiers Op1, Op3 and Op5 carry out control so that transistors Tr21, Tr23 and Tr25 having sources connected to these terminals are placed in the on mode.

When the potential occurring at terminals U, W and V is lower than the potential of the ICOM terminal, operational amplifiers Op2, Op4 and Op6 turn on transistors Tr22, TR24 and Tr26, the drains of which are connected to the terminals.

As a result, voltage generated by the back electromotive force of coils LU, LV and LW is rectified and output to the ISO5V power source line, as indicated in FIG. 3.

VDD Regulator 46

When switch SW33 is in the on mode (during normal operation), VDD regulator 46 generates a voltage of approximately 7 V based on the output voltage of charging pump circuit 16 and it charges the capacitor C12 and an electric potential of approximately 7 V is generated at the V7 terminal. Moreover, the output voltage of this VDD regulator 46 is supplied to RET power source circuit 48.

The voltage of 7 V for the V7 terminal and 12 V for the V12 terminal are used to drive the circuit during a retraction operation.

When switch SW33 is in the off mode (during a retraction operation), VDD regulator 46 generates a voltage of approximately 7 V based on the charge charged to capacitor C11 and it is supplied to RET power source circuit 48.

RET Power Source Circuit 48

RET power source circuit 48 is provided with a power source circuit used to supply electric power to an internal analog circuit, a power source circuit used to supply electric power to an internal digital circuit, a clock signal generation circuit and a reference voltage (current) generation circuit and the like during the retraction operation.

RET Control Unit 50

RET control unit 50 receives a power source voltage and clock signals from RET power source circuit 48 and controls RETSPM driver 44 and RETVCM driver 52.

During a retraction operation, power is supplied to an internal analog circuit and a digital circuit, a clock is supplied and a reference voltage (current) is supplied by RET power source circuit 48. RET power source circuit 48 is designed so that it operates while consuming less power than the power source during normal operation.

RETVCM Driver 52

RETVCM driver 52 comprises a driver used to drive each of transistors Tr31-Tr34 of VCM-FET circuit 38 as well as VCM voltage control circuit 80. In FIG. 4, only the VCM voltage control circuit 80 is indicated. A/D converter 61 and retraction control circuit 63 indicated in FIG. 4 are contained in RET control unit 50 in FIG. 1.

A/D converter 61 receives a voltage (voltage arising across VCM39) between the VCMA terminal and an RSENP terminal, converts the voltage that has been subjected to sample-and-holding to a digital value and outputs this to retraction control circuit 63.

When the drive operation for VCM39 is completed, transistors Tr31, Tr33 and Tr34 are in the off mode, transistor TR32 is in the on mode and switch SW41 is on, A/D converter 61 converts the back electromotive force produced in VCM39 to a digital signal. Said back electromotive force is large enough to accommodate the drive speed of the head using VCM39.

Here, transistors Tr31, Tr32, Tr33 and Tr34 are controlled by retraction control circuit 63 and the on/off mode for switch SW41 is controlled by control signals from retraction control circuit 63.

Retraction control circuit 63 controls the driving of VCM39 by controlling transistors Tr31, Tr32, Tr33 and Tr34 based on the digital value of the back electromotive force of VCM39 input from A/D converter 61.

Specifically, when the retraction speed of the head is accelerated in accordance with the output value of A/D converter 61, retraction control circuit 63 outputs control signals so that they are connected to the side of input terminals U51 and U52 (unloading side) relative to switches SW51 and SW52 and outputs control signals to switch SW56 to convert the gate of transistor Tr32 to the VCMAG side of switch SW54. At the same time, control signals are supplied to switch SW57 so that the gate of transistor Tr34 is connected to the retraction control circuit 63 side. Then, control signals for placing transistor Tr33 in the on mode and for placing transistors Tr31 and Tr34 in the off mode are output. At this time, switch SW54 is controlled by retraction control circuit 63 so that the VCMAG side is selected.

Moreover, when the retraction speed of the head is slowed down in accordance with the output value of A/D converter 61, retraction control circuit 63 outputs control signals to switches SW51 and SW52 so they are connected to the input side (loading side) of terminals L51 and L52. At the same time. control signals are provided to switch SW56 so that the gate of transistor Tr32 is connected to the retraction control circuit 63 side. Control signals are supplied to switch SW57 so that the gate of transistor Tr34 is connected to the VCMBG side of switch SW54. Then, control signals are output that place transistor Tr31 in the on mode and transistors Tr32 and Tr33 in the off mode. At this time, switch SW54 is controlled, by retraction control circuit 63 so that the VCMBG side is selected.

When the speed of the head is maintained in accordance with the output value of A/D converter 61 and when driving of VCM39 is stopped, control signals that place transistors Tr31, Tr33 and Tr34 in the off mode and transistor Tr32 in the on mode are output. At this time, switches SW56 and SW57 are switched and controlled so that the retraction control circuit 63 side is selected.

Retraction control circuit 63 is also used to carry out a variety of controls based on control signals from general control circuit 90 used to control the overall operation of HDD control unit 1.

When power failure, ambient temperature outside the operating range, a decline in the rotation of spindle motor 30 or another retraction start condition stipulated in advance is satisfied, general control circuit 90 controls the start of a retraction operation. Moreover, when a prescribed retraction completion condition is satisfied, general control circuit 90 carries out control so that a return is made from a retraction operation to normal operation.

Switch SW31 that is placed between VCM-FET circuit 38 and RETVCM driver 52 is omitted from FIG. 4. Switch SW31 in FIG. 4 is located between the gates of transistors Tr31 and Tr33 and retraction control circuit 63, between the gate of transistor Tr32 and switch SW56 and between the gate of transistor Tr34 and switch SW57 and is used to control switching of the signal line connected to the gate of each of transistors Tr31-Tr34.

The output voltage of operational amplifier Op21 is supplied to the gate of transistor Tr32 via switches SW54 and SW56 in the unloading operation for a retraction operation. A this time, the resistance value (voltage) between the drain source of transistor Tr32 is controlled by the voltage of the gate of transistor Tr32.

The output voltage of operational amplifier Op21 is supplied to the gate of transistor Tr34 via switch SW54 and switch SW57 in the unloading operation of a retraction operation.

At this time, the resistance value (voltage) between the drain·source of transistor Tr34 is controlled by the voltage of the gate of transistor Tr34.

Furthermore, in normal operation, transistors Tr31, Tr32, Tr33 and Tr34 are controlled so that they are on or off by VCM driver 14 indicated in FIG. 1 via switch SW31.

VCM voltage control circuit 80 is provided with switch SW51, switch SW52, resistance R50, current source circuit 82, operational amplifier Op21 and switch SW54.

The output voltage of VCM voltage control circuit 80 is supplied either to the gate of transistor Tr32 via the VCMAG terminal or to the gate of transistor Tr34 via the VCMBG terminal using switch SW54.

As indicated in FIG. 4, the input terminal L51 of switch SW51 is connected to the RSENP terminal. The input terminal U51 of switch SW51 is connected to the VCMA terminal. The output terminal of switch SW51 is connected to the negative terminal of operational amplifier Op21.

The input terminal L52 of switch SW52 is connected to the VCMA terminal. The input terminal U52 of switch SW52 is connected to the RSENP terminal. The output terminal of switch SW52 is connected to one end of resistance R50.

The other end of resistance R50 is connected to current source circuit 82 and to the positive terminal of operational amplifier Op21.

Current source circuit 82 is a variable current circuit and the current value is controlled by retraction control circuit 63.

The output terminal of operational amplifier Op21 is connected to the input terminal of switch SW54. Switch SW54 connects the abovementioned input terminal to either the VCMAG terminal or the VCMBG terminal.

Switches SW51, SW52 and SW54 of VCM voltage control circuit 80 are controlled by retraction control circuit 63 indicated in FIG. 4.

Next, the unloading operation and loading operation for the retraction operation for the HDD control device 1 in the embodiment of the present invention will be described focusing on the operation of RETVCM driver 52 indicated in FIG. 4.

For example, when general control circuit 90 detects that the power source has been cut off, switch SW21 indicated in FIG. 1 is switched to the RETSPM driver 44 side by RET control signals.

This is how the circuit indicated in FIG. 2 is configured. Moreover, the RET control signals are used to turn on switches SWV, SWU, SW11 and SWW of RETSPM driver 44 indicated in FIG. 2.

Then, as indicated above, the voltage generated by the back electromotive force of coils LU, LV and LW is rectified using the on/off control of each of the transistors in SPM-FET circuit 32 by each of the operational amplifiers of RETSPM driver 44, as indicated in FIG. 3, and is output to the ISO5V power source line.

Moreover, switch SW31 is switched to the RETVCM driver 52 side by the RET control signals.

As a result, the circuit connection state for RETVCM driver 52 indicated in FIG. 4 for the VCM39 peripheral circuit results.

First, retraction control circuit 63 moves (unloads) the head in the retraction direction. This means that retraction control circuit 63 sets transistor Tr33 in the on mode, sets transistors Tr31 and Tr34 in the off mode, and connects switch SW56 to the VCMAG side of switch SW54. The output terminal of switch SW51 is connected to the U51 input terminal, the output terminal of switch SW52 is connected to the U52 input terminal and the input terminal of switch SW54 is connected to the VCMAG terminal.

As a result, the current flows from the VCMB terminal in the direction of the VCMA terminal to VCM 39 and the head is unloaded.

During unloading, the electric potential (V(VCMA)) of the VCMA terminal is supplied to the negative terminal of operational amplifier Op21. Moreover, an electric potential (V(RSENP)–ΔV) with a voltage drop at resistance R50 caused by the current of current source circuit 82 from the electric potential of the RSENP terminal on one end of VCM39 is supplied to the positive terminal of operational amplifier Op21.

Operational amplifier Op21 controls the voltage supplied to the gate of transistor Tr32 so that the difference in the electric potential (V(VCMA)) of the VCMA terminal and the electric potential (V(RSENP)–ΔV) at the center point when connected to resistance 50 and current source circuit 82 is decreased.

Figure 5A:
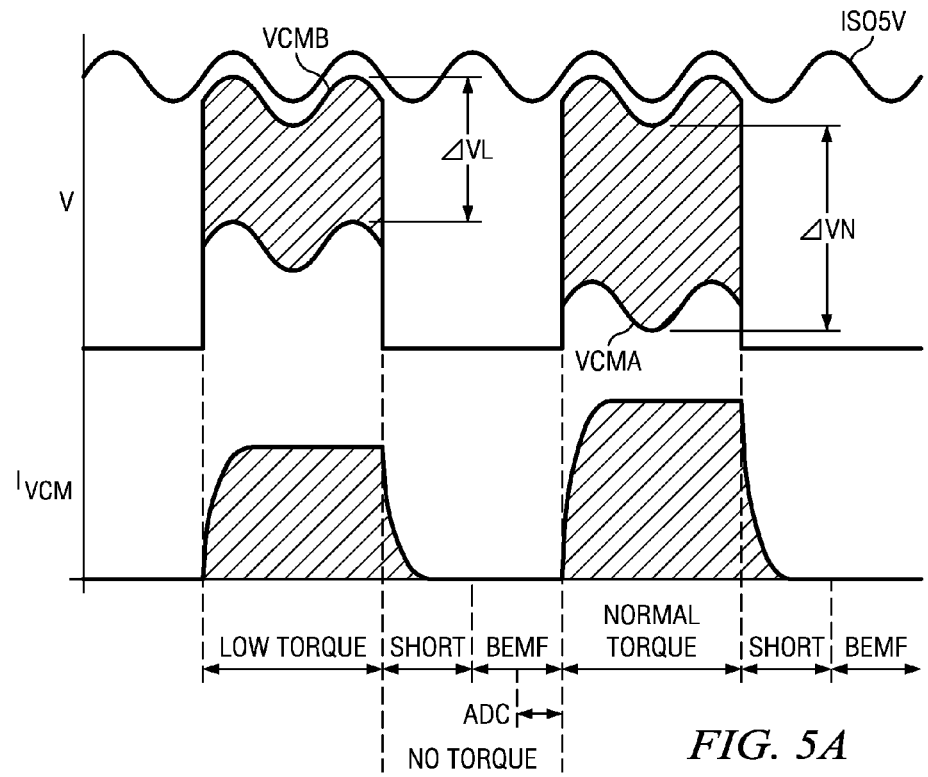
FIG. 5 is a diagram explaining the voltage and current produced in a VCM during a retraction operation.

Then, the resistance value between the drain•source of transistor Tr32 is controlled by the voltage supplied from operational amplifier Op21 to the gate of transistor Tr32 so that the voltage produced across VCM39 is controlled so that it is ΔV. Here, the voltage of the ISO5V power source line is supplied to the RSENP terminal via transistor Tr33. The voltage of the ISO5V power source line is produced by the back electromotive force of spindle motor 30 and comprises a voltage pulse as indicated in FIG. 3. As a result, the voltage at the VCMB terminal, the RSENP terminal and the VCMA terminal comprises the same voltage pulse as the voltage of the ISO5V power source line, as indicated in FIG. 5(A). The voltage applied to VCM39 is the differential voltage between the voltage at the RSENP terminal and the voltage at the VCMA terminal so that it becomes a voltage which is virtually constant wherein the abovementioned voltage pulse is removed.

In VCM voltage control circuit 80, the voltage between the VCMA terminal and the RSENP terminal is controlled so that it becomes voltage ΔV indicated above. The voltage drop ΔV occurring in resistance R50 due to the current of current source circuit 82 roughly coincides with the voltage applied across VCM39.

As indicated in FIG. 5(A), voltage (ΔVL or ΔVN) having a virtually constant amplitude is applied to VCM39 and the arm of the head is driven by the torque corresponding to that voltage. Furthermore, drive voltage $I_{VCM}$ of VCM39 is controlled so that the rise and fall are smooth, as indicated in FIG. 5(A), and the acoustic noise accompanying the movement of the head arm is reduced. This acoustic noise readily occurs if the rise and fall of the drive voltage of the drive current of VCM39 is abrupt so the acoustic noise can be reduced by providing a through rate to the rise and fall.

Then, after the abovementioned drive voltage is applied to VCM39 for a prescribed period of time, retraction control circuit 63 places transistors TR31, Tr33 and Tr34 in the off mode, transistor Tr32 is placed in the on mode and the application of drive voltage to VCM39 is stopped. Next, retraction control circuit 63 places switch SW41 in the on mode and inputs the voltage (potential difference) between the VCMA terminal and the RSENP terminal where the back electromotive force of VCM39 occurs to A/D converter 61. This voltage is subjected to sample-and-hold processing and a digital value that has been subjected to A/D conversion is output from A/D converter 61. Said digital value corresponds to the drive speed of the head due to VCM39.

Retraction control circuit 63 determines the application time and the size of the drive voltage for VCM39 based on the abovementioned digital value so that the head is accommodated within a constant speed range. The size of the drive voltage is used to set (adjust) the current value of current source circuit 82.

For example, when the head exceeds a certain speed range, retraction control circuit 63 is used to carry out a loading operation to decrease the speed of the head.

During a loading operation, retraction control circuit 63 drives VCM39 so that the head is moved in a direction opposite the retraction direction. This means, as shown in FIG. 4, that retraction control circuit 63 sets transistor Tr31 in the on mode and sets transistors Tr33 and Tr24 in the off mode, the output terminal of switch SW51 is connected to input terminal L51, switch SW57 is connected to the VCMBG side of switch SW54, the output terminal of switch SW52 is connected to input terminal L52 and the input terminal of switch SW54 is connected to the VCMBG terminal.

As a result, a current flows from the VCMA terminal in the direction of the VCMB terminal to VCM 39 and the head is unloaded.

During loading, electric potential (V(RSENP)) of the RSENP terminal is supplied to the negative terminal of operational amplifier Op21. Moreover, electric potential (V(VCMA)–ΔV) having a voltage drop at resistance R50 caused by a current from current source circuit 82 is supplied from the electric potential of the VCMA terminal on one end of VCM39 to the positive terminal of operational amplifier Op21.

Operational amplifier Op21 controls the voltage supplied to the gate of transistor Tr34 so that the difference in the electric potential (V(RSENP)) of the RSENP terminal and the electric potential (V(VCMA)–ΔV) at the center point of the connection between resistance 50 and current source circuit 82 is diminished.

Then, the resistance value between the drain•source of transistor Tr34 is controlled by the voltage supplied from operational amplifier Op21 to the gate of transistor Tr34 so that the voltage arising across VCM39 becomes ΔV. Here, the electric potential of the VCMA terminal is linked to the voltage of the ISO5V power source line so that the voltage applied to VCM39 becomes the roughly constant voltage (ΔVL or ΔVN) indicated in FIG. 5(B).

VCM voltage control circuit 80 exercises control so that the voltage between the VCMA terminal and the RSENP terminal becomes voltage ΔV indicated above. As a result, the voltage applied to VCM39 changes to ΔVL and ΔVN according to the size of ΔV as indicated in FIG. 5(B).

After the abovementioned drive voltage is applied to VCM39 for a prescribed period of time and transistors Tr31, Tr33 and Tr34 are placed in the off mode and transistor Tr32 is placed in the on mode, retraction control circuit 63 stops the application of drive voltage to VCM39. Next, retraction control circuit 63 is used to place switch SW41 in the on mode and to input the voltage (potential difference) between the VCMA terminal where the back electromotive force for VCM39 is generated and the RSENP terminal to A/D converter 61. A voltage that has been subjected to sample-and-hold processing is output from A/D converter 61 whose digital value has been subjected to A/D conversion. Said digital value corresponds to the driving speed of the head depending on VCM39.

Retraction control circuit 63 determines the application time and the size of the drive voltage for VCM39 based on the abovementioned digital value so that the head is accommodated within a constant speed range. The size of the drive voltage is used, for example, to set (adjust) the current value of current source circuit 82.

Figure 5B:
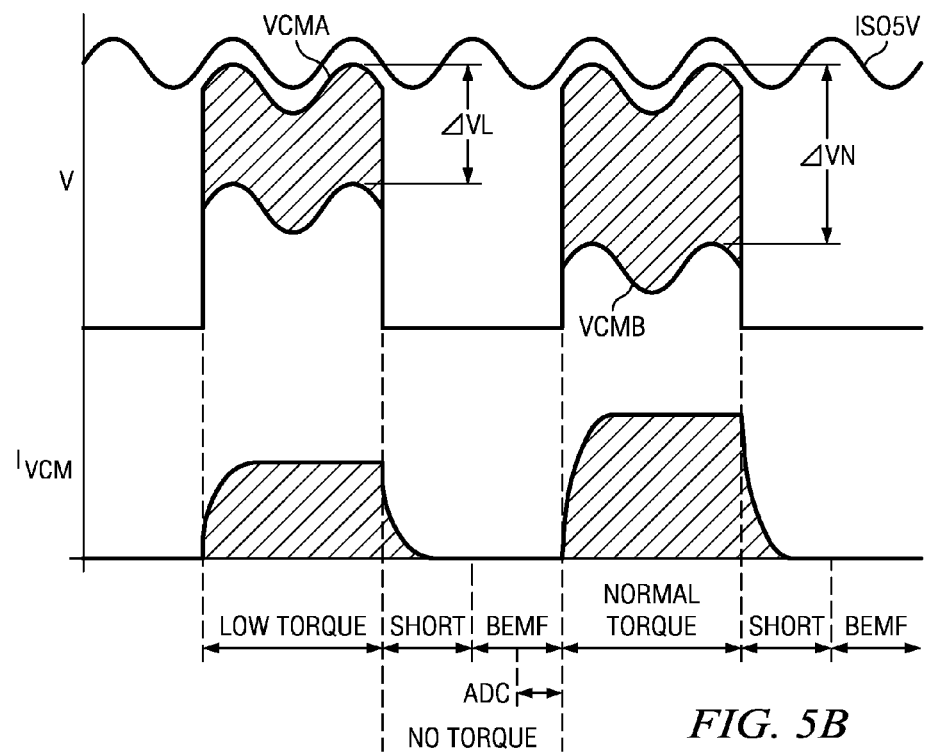

As indicated in FIG. 5(B), the rise and fall of drive current $I_{VCM}$ of VCM 39 is smoothed so that the occurrence of acoustic noise is inhibited. Retraction control circuit 63 is used to switch the abovementioned unloading operation and loading operation so that the head is within a certain speed range and the speed of the head is controlled.

RETVCM driver 52 can adjust the voltage occurring across VCM 39, that is, the torque of VCM 39, by adjusting the current value of current source circuit 82 of VCM voltage control circuit 80 using retraction control circuit 63 and adjusting the abovementioned voltage drop ΔV.

For example, when VCM 39 is operated at low torque (during weak unloading/loading), RETVCM driver 52 reduces the current value of the output current of current source circuit 82 below that when operating at normal torque (when unloading/loading).

For example, RETVCM driver 52 is used to switch successively to the low torque mode, no torque mode, normal torque mode and driving of VCM 39 by controlling retraction control circuit 63, as indicated in FIG. 5(A). Here, in the low torque mode, the abovementioned voltage drop is set to ΔVL. Moreover, in the no torque mode, transistors TR31, Tr33 and Tr34 indicated in FIG. 4 are controlled so that they are in the off mode and transistor Tr32 is controlled to the on mode. Moreover, switch SW41 is controlled to the on mode for a prescribed period of time in this no torque mode. Further, in the normal torque mode, the abovementioned voltage drop is set to ΔVN (>ΔVL).

Figure 6:
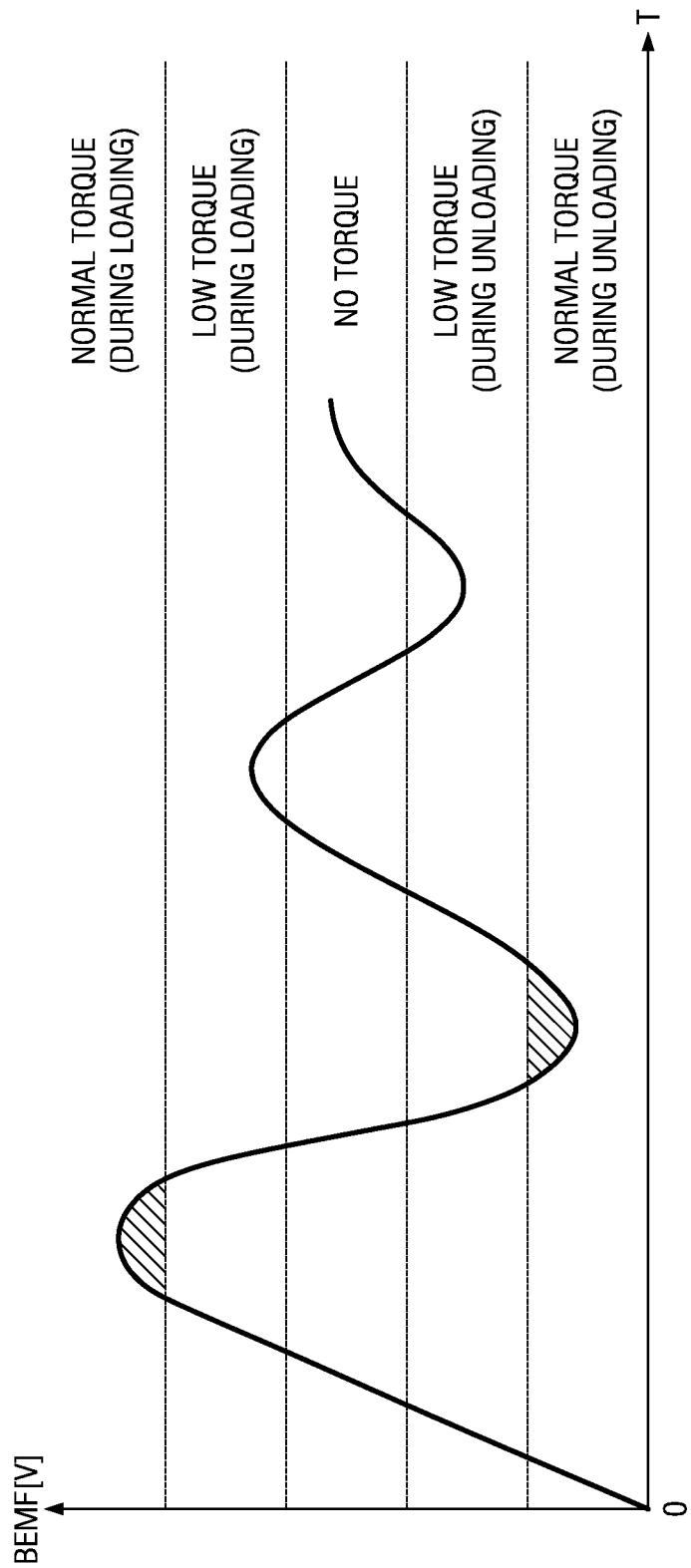
FIG. 6 is a diagram explaining speed control in a plurality of torque modes using the RETVCM driver during a retraction operation.

In the abovementioned examples, five modes—normal torque mode during loading, low torque mode during loading, no torque mode, low torque mode during unloading and normal torque mode during unloading—were prescribed as torque modes, as indicated in FIG. 6.

Retraction control circuit 63 is used to switch the abovementioned five modes and control the speed of the arm, as indicated in FIG. 6, based on the back electromotive force (BEMF) generated in VCM 39.

Figure 7A:
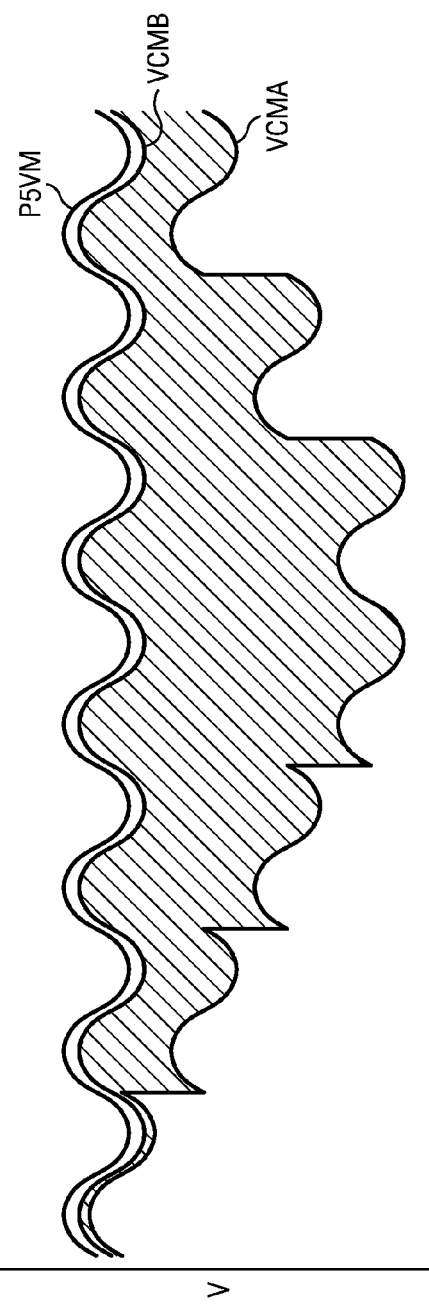
FIG. 7 is a diagram explaining an example of VCM speed control using the RETVCM driver indicated in FIG. 4.

For example, the electric potential occurring at the VCMA terminal can be switched in stages while maintaining the occurrence of a pulsating voltage in the voltage of the ISO5V power source line by gradually switching the current value of current source circuit 82 using retraction control circuit 63, as indicated in FIG. 7(A).

Figure 7B:
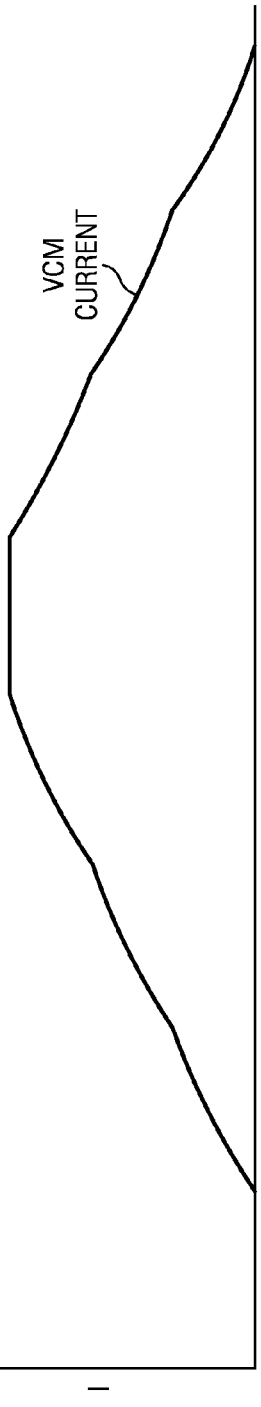

As a result, the voltage occurring across VCM 39 can be switched gradually when the pulsating voltage has been canceled. As a result, the current flowing to VCM 39 can be changed smoothly and the occurrence of acoustic noise can be inhibited as indicated in FIG. 7(B).

Figure 8A:
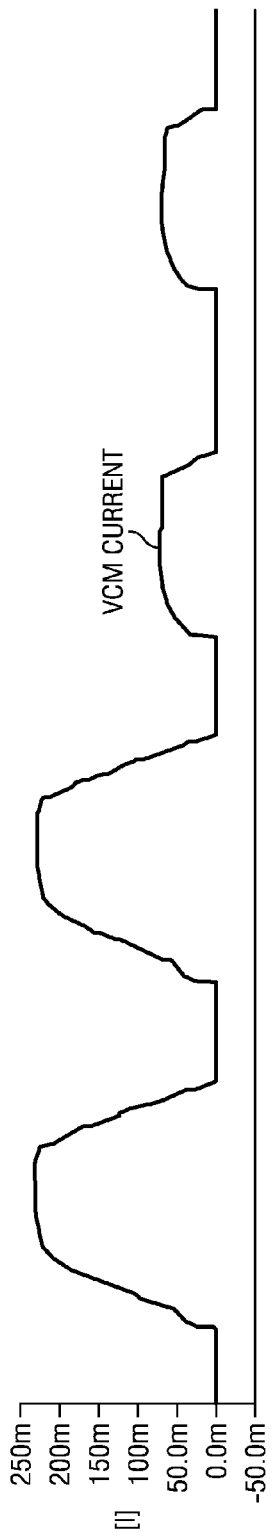
FIG. 8 is a diagram explaining another example of VCM speed control using the RETVCM driver indicated in FIG. 4.
Figure 8B:
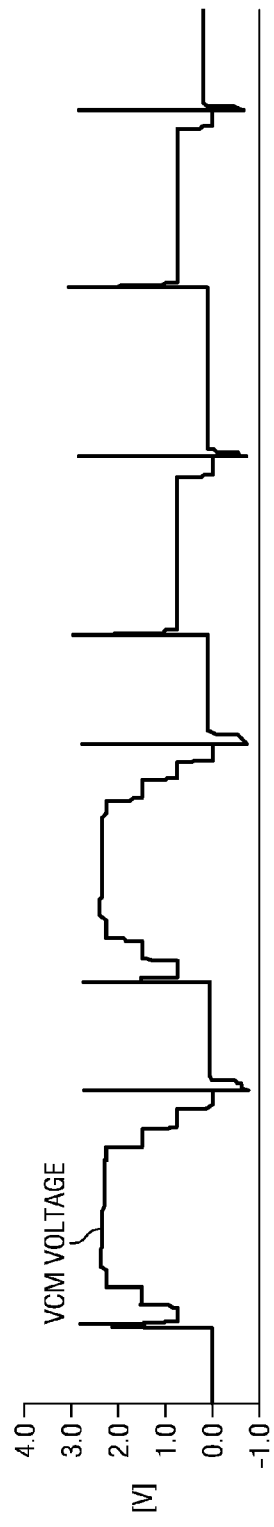
Figure 8C:
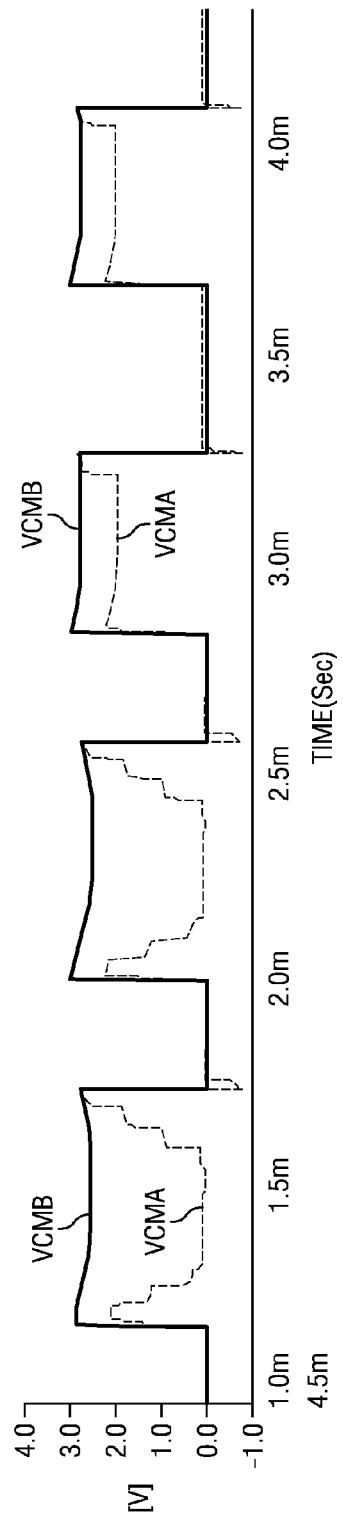

Moreover, the voltage indicated in FIG. 8(B) is generated across VCM 39 by switching the voltage supplied to the VCMA terminal and the VCMB terminal using retraction control circuit 63, as indicated in FIG. 8(C). As a result, the current occurring in VCM 39 can be changed so that it is smooth, as indicated in FIG. 8(A).

Furthermore, an example of controlling the speed of VCM 39 based on the current value of current source circuit 82 of VCM voltage control circuit 80 was illustrated in the abovementioned embodiment the present invention. However, the time during which torque is provided to VCM 39 as well as the no torque time during which no torque is provided may be adjusted and the speed of VCM 39 may be adjusted. Furthermore, the speed of VCM 39 may be controlled by a combination of adjusting said time and adjusting the current value of the abovementioned current circuit 82. The acoustic noise can be further inhibited by smoothing the rise and fall of the drive voltage of VCM 39.

As explained above, the occurrence of a voltage pulse arising in the ISO5V power source line can be avoided in the drive voltage of VCM 39 in a retraction operation and acoustic noise can be avoided. The rise and fall of the drive voltage and the drive current for VCM 39 can be slowed down, thereby making it Possible to further inhibit acoustic noise.

Moreover, when HDD control unit 1 is used, the speed of VCM 39 is controlled in a retraction operation so that a shock to the head can be inhibited upon stopping and the durability can be increased.

Furthermore, in the abovementioned embodiment of the invention, the abovementioned acoustic noise can be inhibited by RETVCM driver 52 that is relatively small in scale.

Moreover, in the abovementioned embodiment of the invention, the on/off slope of the drive current for VCM 39 can be made gentler by slew rate adjustment that switches the voltage applied to VCM 39 in stages.

It should by no means be construed that the present invention is restricted to the abovementioned embodiment of the present invention.

Therefore a person skilled in the art could carry out a number of changes, combinations, sub-combinations as well as substitutions regarding the constituent components of the abovementioned embodiment of the present invention within the technical range or equivalent range of the present invention.

In the abovementioned embodiment of the present invention, a three-phase DC motor was illustrated as the spindle motor of the present invention. However, no restriction should by any means be construed as long as the electric potential from the back electromotive force can be rectified.

The present invention can be applied to a disk device provided with an emergency head retraction function.

The invention claimed is:

1. A hard disk drive comprising:
A. a first voltage supply lead and a voltage return lead;
B. a voice coil motor having opposed terminals;
C. an FET circuit having inputs connected to the first voltage supply lead, the voltage return lead, and the opposed terminals of the voice coil motor, and having FET gate inputs;
D. a back EMF A/D converter having analog input leads connected to the opposed terminals of the voice coil motor and having a digital output;
E. a retraction control circuit having a digital input connected to the digital output, having outputs selectively coupled to the FET gate inputs, and having a voltage control output; and
F. a voltage control circuit having an input coupled to the voltage control output, having inputs selectively coupled to the voice coil motor terminals, and having outputs selectively connected to at least some of the FET gate inputs.

2. The hard disk drive of claim 1 in which the voice coil motor has three terminals: VCMA, RSENP, and VCMB, and including a coil connected between terminals VCMA and RSENP, and a resistor connected between terminals RSENP and VCMB.

3. The hard disk drive of claim 1 in which the FET circuit has two pairs of FET drive transistors connected between the first voltage supply lead and the voltage return lead, and each pair of drive transistors is coupled to one of the opposed voice coil motor terminals.

4. The hard disk drive of claim 1 in which the voice coil motor has three terminals: VCMA, RSENP, and VCMB, and including a coil connected between the VCMA and RSENP terminals, and a resistor connected between the RSENP and VCMB terminals, the back EMF A/D converter has two input leads connected to the VCMA and RSENP terminals.

* * * * *